(12) United States Patent
Lee et al.

(10) Patent No.: US 9,580,027 B2
(45) Date of Patent: Feb. 28, 2017

(54) WIRING HARNESS ASSEMBLY OF DOOR MODULE

(71) Applicants: Jae Won Lee, Chungcheongnam-Do (KR); Jae In Yu, Chungcheongnam-Do (KR); Hang Chul Ko, Chungcheongnam-Do (KR); Sung Ik Cho, Chungcheongnam-Do (KR); Hue Yeon An, Chungcheongnam-Do (KR)

(72) Inventors: Jae Won Lee, Chungcheongnam-Do (KR); Jae In Yu, Chungcheongnam-Do (KR); Hang Chul Ko, Chungcheongnam-Do (KR); Sung Ik Cho, Chungcheongnam-Do (KR); Hue Yeon An, Chungcheongnam-Do (KR)

(73) Assignee: Seoyon E-Hwa Co., Ltd. (KR)

( * ) Notice: Subject to any disclaimer, the term of this patent is extended or adjusted under 35 U.S.C. 154(b) by 0 days.

(21) Appl. No.: 15/014,162

(22) Filed: Feb. 3, 2016

(65) Prior Publication Data

US 2016/0221517 A1    Aug. 4, 2016

(30) Foreign Application Priority Data

Feb. 3, 2015 (KR) ...................... 10 2015 001 6589

(51) Int. Cl.
*B60R 16/02* (2006.01)
*B60J 5/04* (2006.01)

(52) U.S. Cl.
CPC ......... *B60R 16/0207* (2013.01); *B60J 5/0418* (2013.01)

(58) Field of Classification Search
IPC ............... B60R 16/0207,16/0215, 16/03; B60J 5/0413, 5/0416
See application file for complete search history.

(56) References Cited

U.S. PATENT DOCUMENTS

| 4,882,842 A | * | 11/1989 | Basson | ................... B60J 5/0416 264/255 |
| 4,907,836 A | * | 3/1990 | Ueda | ...................... B60J 5/0416 174/72 A |
| 5,193,895 A | * | 3/1993 | Naruke | ................... B60Q 1/323 362/249.01 |
| 5,805,402 A | * | 9/1998 | Maue | ................... B60R 16/0207 307/10.1 |
| 5,936,818 A | * | 8/1999 | Maue | ................... B60R 16/0207 361/115 |

(Continued)

FOREIGN PATENT DOCUMENTS

| FR | 2 785 244 | * | 5/2000 |
| KR | 10-2006-0068746 A | | 6/2006 |
| WO | WO 02/16155 | * | 2/2002 |

OTHER PUBLICATIONS

Korean Office Action for Application No. 10-2015-0016589 dated Jun. 2, 2016.

*Primary Examiner* — Gregory Strimbu
(74) *Attorney, Agent, or Firm* — Tarolli, Sundheim, Covell & Tummino LLP

(57) ABSTRACT

A wiring harness assembly of a door module, includes: an FPCB (Flexible Printed Circuit Board) connected to an external power supply for supplying electricity to a plurality of electric devices installed on the door module; a cover member coupled to the FPCB while protecting the FPCB; and a rib for protecting the FPCB from water.

2 Claims, 4 Drawing Sheets

(56) References Cited

U.S. PATENT DOCUMENTS

| | | | | |
|---|---|---|---|---|
| 6,245,997 | B1 * | 6/2001 | Serizawa | B60R 16/0207 174/71 R |
| 6,462,279 | B1 * | 10/2002 | Serizawa | B60Q 3/0203 174/72 A |
| 2002/0064031 | A1 * | 5/2002 | Serizawa | B60R 16/0207 361/749 |
| 2002/0105358 | A1 * | 8/2002 | Ohashi | B60R 16/0215 326/136 |
| 2005/0148213 | A1 * | 7/2005 | Takase | B60R 16/0215 439/34 |
| 2006/0090920 | A1 * | 5/2006 | Fujita | B60R 16/0207 174/72 A |
| 2008/0197700 | A1 * | 8/2008 | Hartmann | B60R 16/0215 307/10.1 |
| 2009/0122509 | A1 * | 5/2009 | Castillo Garcia | H05K 1/118 361/827 |
| 2013/0292159 | A1 * | 11/2013 | Gotou | H01B 7/0045 174/250 |
| 2014/0331563 | A1 * | 11/2014 | Quinn | B60J 10/08 49/475.1 |
| 2015/0329069 | A1 * | 11/2015 | Daugherty | B60R 16/0215 174/72 A |

* cited by examiner

WIRING HARNESS ASSEMBLY OF DOOR MODULE

BACKGROUND OF THE INVENTION

Field of the Invention

Exemplary embodiments of the present invention relate to a wiring harness assembly of a door module, and more particularly, to a wiring harness assembly of a door module, in which a plurality of wiring harnesses for supplying electricity to electric devices installed in a door are configured as one part, in order to facilitate an assembly process while simplifying the configuration.

Description of the Related Art

Recently, in an assembly process for complete vehicles, more and more modules, each of which includes unit parts assembled therein, have been employed in order to downsize the assembly line and to improve workability. For example, a door module including a door function has been proposed.

Such a door module is mounted on the door while including certain functional units of the door. The door module may be formed of plastic to reduce the weight of the door.

The functional units may include electric devices such as a window regulator system, an internal handle, a speaker support, an electric cable holder, and an electric side-mirror switch.

The electric devices having various functions must receive power for operation. In order to supply power, a separate electric cable is connected to a power supply unit separated from the door.

That is, the respective devices are connected to the power supply unit through separate electric cables, and the electric cables are bound and arranged by a cable tie or covered and protected by a separate protection member.

In the wire harness structure of the conventional door module, the electric devices performing various functions are connected through separate electric cables. Thus, the structure of the wire harness structure is very complex, a large amount of time is required for assembling the wire harness structure, and the price of the product is inevitably increased.

SUMMARY OF THE INVENTION

The present invention has been made in view of the above problems, and it is an object of the present invention to provide a wiring harness of a door module, in which electric cables for connecting electrical devices to a power supply unit are configured as one part, in order to simplify the installation structure and to facilitate an assembly operation.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

According to one aspect of the present invention, there is provided a wiring harness assembly of a door module, which is coupled to a door module formed as one module for installing a plurality of electric devices and supplies electricity from an external power supply to the electric devices. The wiring harness assembly may include: an FPCB (Flexible Printed Circuit Board) connected to the external power supply and configured to supply electricity to the plurality of electric devices installed in the door module; and a cover member coupled to the door module while protecting the FPCB.

The cover member may be formed in a shape corresponding to an attachment surface of the door module.

The FPCB may be coupled to the inner surface of the cover member.

The door module may include a rib for preventing water from permeating into the FPCB.

The rib may be formed in the door module above the cover member.

The rib may be formed to protrude further than the cover member coupled to the door module.

It is to be understood that both the foregoing general description and the following detailed description of the present invention are exemplary and explanatory and are intended to provide further explanation of the invention as claimed.

According to the embodiment of the present invention, the wiring harness assembly has a simple structure because the electric cables for supplying external electricity to a plurality of electrical devices can be configured as one FPCB. Thus, the assembling performance can be improved, and the unit price of products can be reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

In the accompanying drawings, the thickness or size of each layer is exaggerated, omitted, or schematically illustrated for convenience in description and clarity. Furthermore, the terms as used herein are defined by taking functions of the invention into account and can be changed according to the custom or intention of users or operators. Therefore, definition of the terms should be made according to the overall disclosures set forth herein. The embodiments of the present invention are only examples of components described in claims, and do not limit the scope of the present invention, and claims must be analyzed on the basis of the technical idea throughout the present specification.

Figure 1:
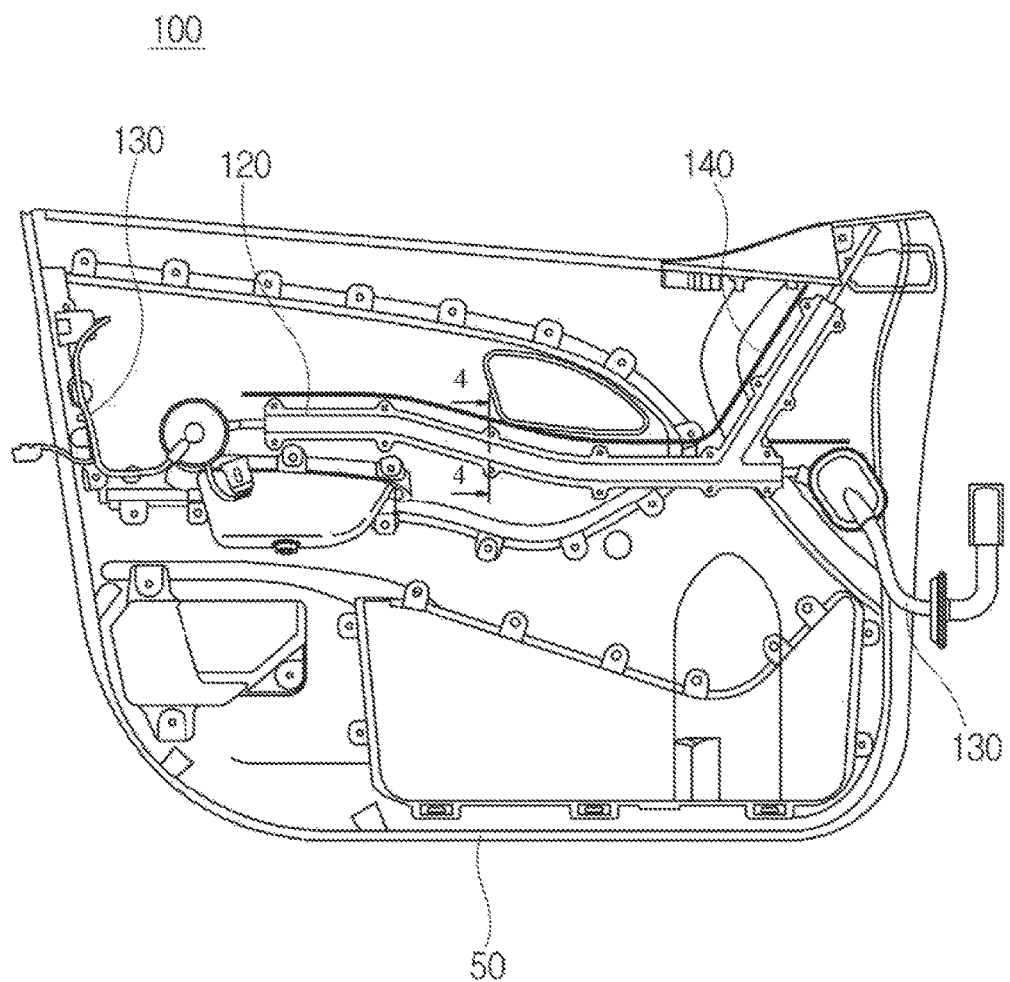
FIG. 1 is a plan view of a door module having a wiring harness assembly installed therein according to an embodiment of the present invention.
Figure 2:
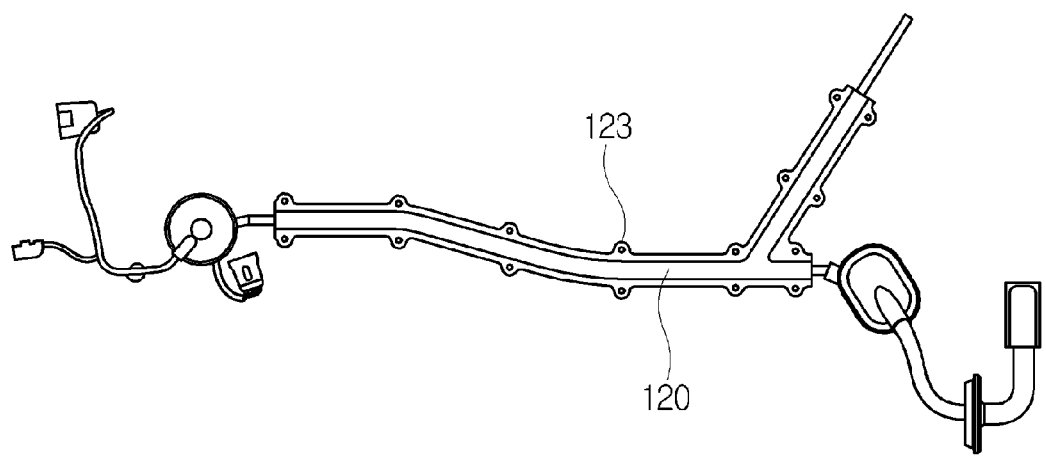
FIG. 2 is a plan view of the wiring harness assembly of FIG. 1.
Figure 3:
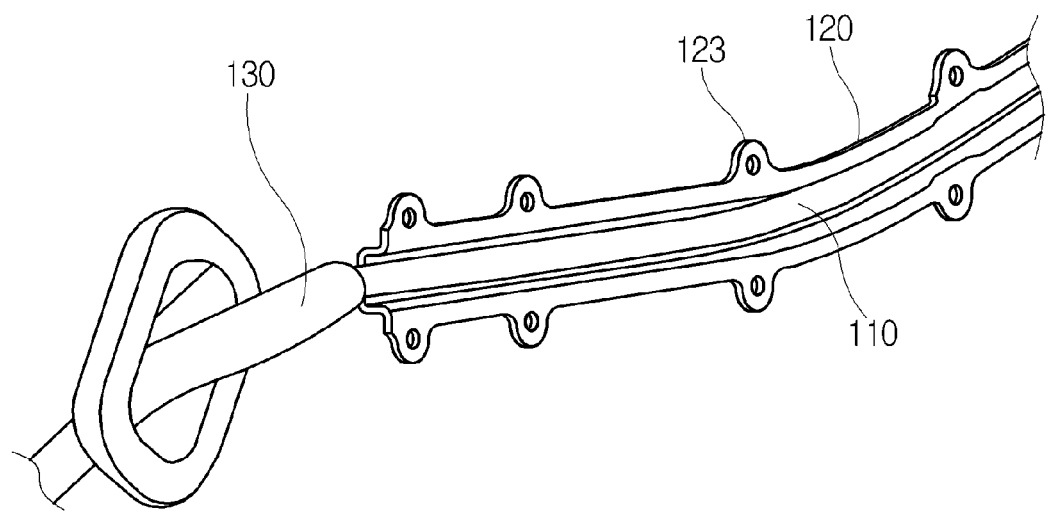
FIG. 3 is a rear view of FIG. 2.
Figure 4:
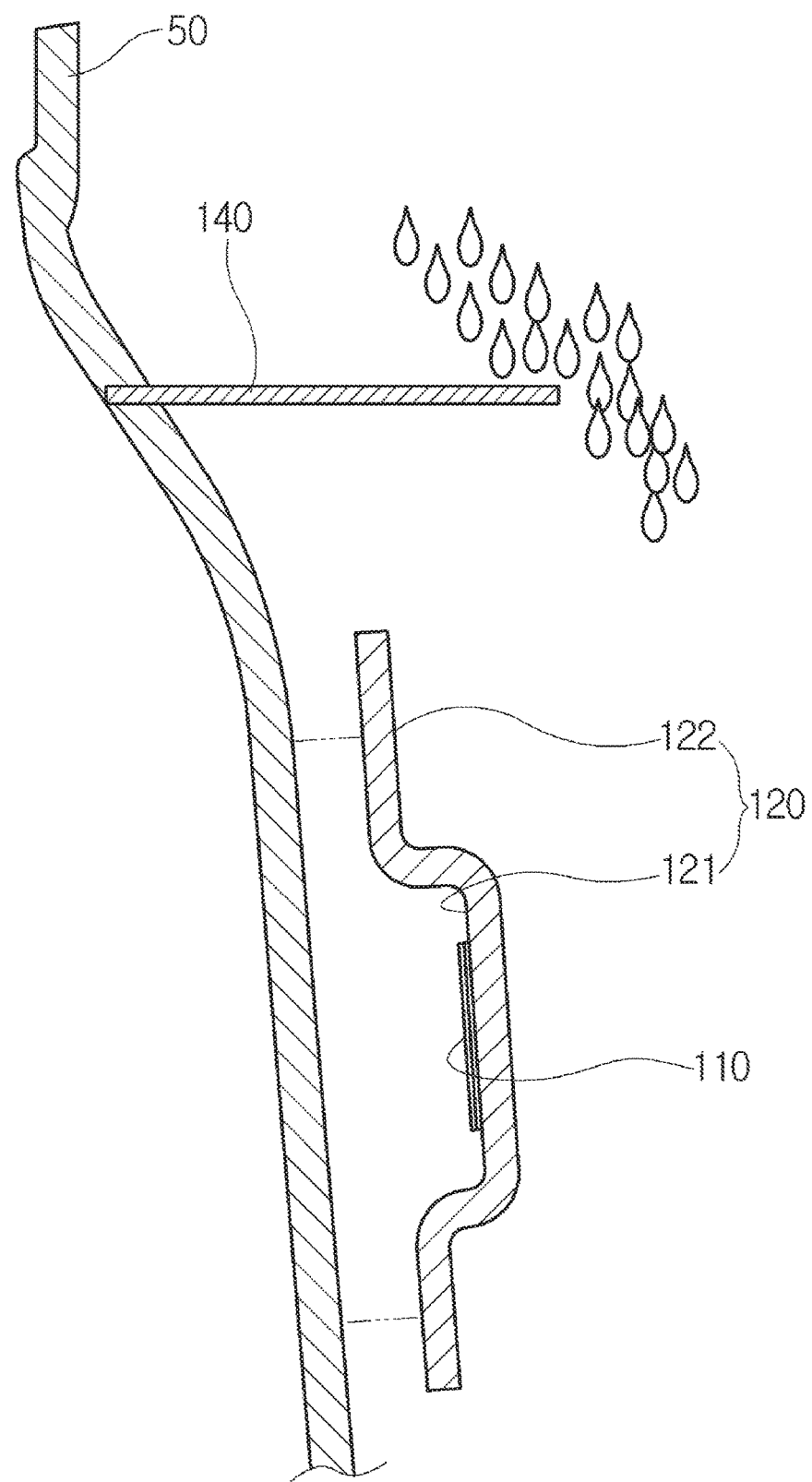
FIG. 4 is a cross-sectional view taken along line 4-4 of FIG. 1.

FIG. 1 is a plan view of a door module having a wiring harness assembly installed therein according to an embodiment of the present invention. FIG. 2 is a plan view of the wiring harness assembly of FIG. 1. FIG. 3 is a rear view of FIG. 2. FIG. 4 is a cross-sectional view taken along line 4-4 of FIG. 1.

The wiring harness assembly 100 is installed in the door so as to supply electricity from a power supply unit installed in a vehicle body to a window regulator system, an internal handle, a speaker support, an electric cable holder, and an electric side-mirror switch, which are electrical devices installed in the door.

The wiring harness assembly 100 is installed in the door module 50 including various electric parts installed therein. The wiring harness assembly 100 receives electricity from the external power supply unit, and transmits the received electricity to the electric parts. The wiring harness assembly 100 is connected to an electric cable connected to the door.

The wiring harness assembly 100 of the door module according to the embodiment of the present invention includes an FPCB (Flexible PCB) 110 and a cover member 120. The FPCB 110 includes a circuit for electrically connecting to a plurality of electric parts, and the cover member 120 couples the FPCB 110 to the door module 50 while covering and protecting the FPCB 110. At this time, the FPCB 110 is coupled through the cover member 120 to the door module 50 in a state where the FPCB 110 is separated from the door module 50. The FPCB 110 is installed on one surface of the cover member 120, facing the door module 50.

The FPCB 110 is connected to an electric cable which is extended to the door from outside, and supplies electricity to an electric part installed in the door. The FPCB 110 includes a circuit pattern which is electrically connected to the electric cable. The FPCB 110 includes a plurality of connectors for connecting to the electric cables which are connected to the respective electric devices and the power supply unit. The connectors are installed at the edge of the FPCB 110, and connected to the electric cables connected to the respective electric parts.

The cover member 120 covers the FPCB 110 so as to prevent the FPCB 110 from being damaged by another part. When the FPCB 110 is bent and attached to the surface of the door module 50, which is unevenly formed, the FPCB 110 may be easily damaged. However, the cover member 120 is coupled to the door module 50 after the FPCB 110 is coupled to the inner surface of the cover member 120, which makes it possible to prevent the damage of the FPCB 110.

As the cover member 120 is formed in a shape corresponding to the uneven surface of the door module 50 which is formed in a different shape depending on a vehicle model, the cover member 120 is formed in a different shape depending on a vehicle model. That is, the cover member 120 is formed in a shape corresponding to the attachment surface of the door module 50, which is unevenly formed.

The cover member 120 includes a mounting surface 121 on which the FPCB 110 is mounted and a coupling part 122 which is formed by bending the upper and lower parts of the mounting surface 121. The coupling part 122 is coupled to the door module 50 while being in contact with the door module 50.

That is, when the cover member 120 is coupled to the door module 50, the mounting surface 121 on which the FPCB 110 is mounted is spaced at a predetermined distance from the door module 50 by the coupling part 122 formed by bending the mounting surface 121. When the cover member 120 is coupled to the door module 50, the FPCB 110 is mounted on the surface facing the door module 50, in the mounting surface of the cover member 120. In other words, the FPCB 110 is installed on the inside of the cover member 120, that is, the inner surface of the mounting surface 121, facing the door module 50, such that the FPCB 110 is not disturbed by other parts installed in the door module 50.

When the cover member 120 is coupled to the door module 50, the coupling parts 122 may be coupled to the door module 50 through an adhesive or double-sided tape or coupled to the door module through a separate fastening member.

In order to couple the cover member 120 to the door module 50 using screws as fastening members, a plurality of fastening parts 123 are formed at the edge of the coupling part 122. The plurality of fastening parts 123 have fastening holes to which the fastening members are coupled.

The wiring harness assembly 100 of the door module according to the embodiment of the present invention further includes an electric device connecting cable 130 which is connected to a connector of the FPCB 110 and extended from an electric device installed in the door module 50.

Since the electric device connecting cable 130 is exposed to the outside of the door module 50, the electric device connecting cable 130 is coated with a waterproofing material so as not to be stained with water or foreign matters introduced from outside.

Furthermore, a rib 140 is installed on the door module 50, in order to prevent water or foreign matters from entering the FPCB 110 coupled to the inner surface of the door module 50, the water or foreign matters being introduced to the inner surface of the door module 50. The inner surface of the door module 50 faces the outside of the vehicle.

The rib 140 is installed on the door module 50 above the cover member 120, and positioned on the surface to which the FPCB 110 is coupled. The rib 140 may protrude from the inner surface of the door module 50 toward the direction facing the outside.

That is, the rib 140 is formed in a rib shape protruding toward the outside from the attachment surface of the door module 50 above the cover member 120. Furthermore, the rib 140 protrudes further than the cover member 120 having the FPCB 110 mounted therein, in order to prevent water from dropping onto the cover member 120 and entering the FPCB 110.

The rib 140 may be formed integrally with the door module 50 when the door module 50 is injection-molded.

The operation of the wiring harness assembly of the door module according to the embodiment of the present invention will be briefly described through the assembly process of the wiring harness assembly.

First, since the plurality of electric devices are installed at the right positions, respectively, the surface of the door module 50, on which the electric devices are installed, has an uneven shape.

The door module 50 includes the electric device connecting cable 130 installed on the surface facing the outside of the vehicle, and the electric device connecting cable 130 is electrically connected to an electric device installed in the inner panel of the door.

Since the cover member 120 needs to be coupled to the surface on which an electric device is installed, that is, the uneven surface of the door module 50, on which the FPCB 110 for supplying electricity is to be installed, the cover member 120 is injection-molded in a shape corresponding to the uneven surface of the door module 50.

The FPCB 110 is connected to the external power supply unit, and includes a circuit for supplying electricity to the plurality of electric devices installed in the door module 50. This circuit may be configured together with the electrical devices installed in the door module 50, according to the installation positions of the electrical devices, when the door module 50 is designed.

The FPCB 110 is attached to the mounting surface 121 of the cover member 120 through a double-sided tape or adhesive. At this time, the FPCB 110 is attached to the surface facing the door module 50, in the mounting surface 121 of the cover member 120.

Then, the cover member 120 is coupled to the door module 50. At this time, the fastening parts of the cover member 120 are coupled to the door module 50 through screws serving as the fastening members in a state where the FPCB 110 attached to the cover member 120 is set to face the door module 50.

Then, the connector installed in the FPCB 110 is connected to the electric device connecting cable 130 installed in the door module 50.

The wiring harness assembly 100 of the door module according to the embodiment of the present invention has a simple structure because electric cables for supplying external electricity to the plurality of electric devices are implemented as one FPCB 110. Thus, the assembling performance can be improved, and the unit price of products can be reduced.

While the present invention has been described with respect to the specific embodiments, it will be apparent to those skilled in the art that various changes and modifications may be made without departing from the spirit and scope of the invention as defined in the following claims.

What is claimed is:

1. A vehicle door module comprising a wiring harness assembly which is coupled to the door module for supplying electricity from an external power supply to electric devices installed on the door module, wherein the wiring harness assembly comprises:

a flexible printed circuit board connected to the external power supply; and a cover member directly mounted to an inner surface of the door module and protecting the flexible printed circuit board, the cover member being generally U-shaped in cross-section, wherein the flexible printed circuit board is directly mounted to an inner surface of the cover member which faces the inner surface of the door module and is spaced from the inner surface of the door module, wherein the door module comprises a rib for preventing water from permeating into the flexible printed circuit board, and wherein the rib protrudes from the inner surface of the door module further than the cover member protrudes from the inner surface of the door module and is disposed above the cover member.

2. The vehicle door module according to claim 1, wherein the cover member is formed in a shape corresponding to a shape of the inner surface of the door module.

\* \* \* \* \*